(12) United States Patent
Martushev et al.

(10) Patent No.: US 9,626,860 B2
(45) Date of Patent: Apr. 18, 2017

(54) INTRAORAL METHODS AND APPARATUS FOR CONTROLLING SERVICES AND DEVICES

(71) Applicant: Comcast Cable Communications, LLC, Philadelphia, PA (US)

(72) Inventors: Andy Martushev, Castle Rock, CO (US); Mehul Patel, Centennial, CO (US); Jonathan Alan Leech, Denver, CO (US); Edward David Monnerat, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/699,761

(22) Filed: Apr. 29, 2015

(65) Prior Publication Data

US 2016/0321912 A1    Nov. 3, 2016

(51) Int. Cl.
*G08C 17/02*    (2006.01)
*H04Q 9/00*    (2006.01)

(52) U.S. Cl.
CPC .............. *G08C 17/02* (2013.01); *H04Q 9/00* (2013.01); *G08C 2201/20* (2013.01); *G08C 2201/30* (2013.01); *G08C 2201/32* (2013.01); *H04Q 2209/40* (2013.01)

(58) Field of Classification Search
CPC  G08C 17/02; G08C 2201/20; G08C 2201/30; G08C 2201/32; H04Q 9/00; H04Q 2209/40
See application file for complete search history.

(56) References Cited

U.S. PATENT DOCUMENTS

| 4,605,927 A | * | 8/1986 | Katz ........................ A61F 4/00 340/4.14 |
| 5,460,186 A |  | 10/1995 | Buchhold |
| 5,523,745 A | * | 6/1996 | Fortune ..................... A61F 4/00 340/4.12 |
| 5,792,067 A | * | 8/1998 | Karell ................... A61N 1/0548 128/848 |

(Continued)

FOREIGN PATENT DOCUMENTS

WO    9307726 A1    4/1993

OTHER PUBLICATIONS

Struijk, Lotte NS. "Tongue-computer interface for disabled people." International Journal on Disability and Human Development 5.3 (2006): 223-226.

(Continued)

*Primary Examiner* — Brian Miller
(74) *Attorney, Agent, or Firm* — Banner & Witcoff, Ltd.

(57) ABSTRACT

Methods and systems are disclosed that, in some aspects, provide for receiving input from sensors placed in a user's mouth. The methods and systems may include a plurality of sensors in communication with a controller. Each sensor may be affixed to one of a plurality of teeth. The controller may generate an action signal when a sensor signal exceeds a sensor signal threshold value. Aspects of the disclosure also provide for methods that may include detecting a sensor signal exceeding a sensor signal threshold value, generating an action signal, and transmitting the action signal, the action signal comprising information identifying the sensor associated with the detected sensor signal.

20 Claims, 8 Drawing Sheets

(56) References Cited

U.S. PATENT DOCUMENTS

| | | | | |
|---|---|---|---|---|
| 5,989,023 | A * | 11/1999 | Summer | A61C 19/045 433/69 |
| 6,089,864 | A * | 7/2000 | Buckner | A61F 5/56 433/6 |
| 6,222,524 | B1 * | 4/2001 | Salem | A61F 4/00 340/4.11 |
| 6,511,441 | B1 * | 1/2003 | Wakumoto | A61B 5/228 600/561 |
| 6,613,001 | B1 * | 9/2003 | Dworkin | A61C 7/00 600/590 |
| 7,071,844 | B1 * | 7/2006 | Moise | G06F 3/03547 340/4.11 |
| 7,890,193 | B2 * | 2/2011 | Tingey | A61N 1/36014 607/134 |
| 7,918,808 | B2 * | 4/2011 | Simmons | A61F 4/00 345/156 |
| 8,044,766 | B2 * | 10/2011 | Ghovanloo | G06F 3/011 340/4.1 |
| 8,177,705 | B2 * | 5/2012 | Abolfathi | H04R 25/604 181/128 |
| 8,503,930 | B2 * | 8/2013 | Kassayan | H04B 13/005 381/380 |
| 8,537,036 | B2 | 9/2013 | Brusell et al. | |
| 8,961,437 | B2 * | 2/2015 | Al-Tawil | G06F 3/011 600/590 |
| 2004/0130455 | A1 * | 7/2004 | Prochazka | G06F 3/011 340/4.12 |
| 2007/0106138 | A1 * | 5/2007 | Beiski | A61B 5/682 600/349 |
| 2009/0051564 | A1 * | 2/2009 | Najanguaq Sovso Andreasen Strujik | G06F 3/011 340/4.1 |
| 2010/0204624 | A1 * | 8/2010 | Vuillerme | A61F 9/08 601/46 |
| 2012/0259554 | A1 | 10/2012 | Chen et al. | |

OTHER PUBLICATIONS

Cheng, Jingyuan, et al. "On the tip of my tongue: a non-invasive pressure-based tongue interface." Proceedings of the 5th Augmented Human International Conference. ACM, 2014.

Kelly, Daniel. "A Tongue Based Input Device." 6 pages, retrieved on Jun. 30, 2014.

Sardini, Emilio, Mauro Serpelloni, and R. Fiorentini. "Wireless intraoral sensor for the physiological monitoring of tongue pressure." Solid-State Sensors, Actuators and Microsystems (Transducers & Eurosensors XXVII), 2013 Transducers & Eurosensors XXVII: The 17th International Conference on. IEEE, 2013.

Li, Cheng-Yuan, et al. "Sensor-embedded teeth for oral activity recognition." Proceedings of the 2013 International Symposium on Wearable Computers. ACM, 2013.

* cited by examiner

INTRAORAL METHODS AND APPARATUS FOR CONTROLLING SERVICES AND DEVICES

BACKGROUND

Control and use of an electronic device often entails operation via a user's hands. Computers typically require input via keyboards or touchscreens. Home entertainment systems similarly require hand input, for example, to operate a remote control device for a television or for various audio-visual systems and appliances which may be found in a home. Some users may not have use of their hands, and therefore experience difficulty in operating electronic devices. Other users may find it inconvenient to operate electronic devices using their hands, as their hands may be preoccupied with other activities. What is needed is a method and apparatus to allow users to operate or provide input to electronic devices without hand use.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

According to some embodiments, an apparatus is described for receiving input from a user's tongue. The apparatus may include a plurality of sensors, such as pressure sensors or capacitive sensors, which may be affixed to a user's teeth and in communication with a controller. Each sensor may generate a signal upon activation by the user. The controller may generate an action signal when a sensor signal exceeding a sensor signal threshold value is detected. The apparatus may also include a jaw position detector, in communication with the controller, configured to detect a jaw position, such as an angle between an upper jaw and a lower jaw. In some embodiments, the controller may generate an action signal when a sensor signal exceeding a sensor signal threshold value is detected, when the jaw position is within a pre-determined range.

One or more methods are described that may include detecting a sensor signal exceeding a sensor signal threshold value, generating an action signal and transmitting the action signal. The action signal may include information identifying the sensor associated with the sensor signal. The methods may include detecting a jaw position and transmitting the action signal when the jaw position is within a pre-determined range.

In some embodiments, an action signal may be used control or provide input to an electronic device such as a gateway, a television, a digital video recorder, a computer, a thermostat, a refrigerator, or various other appliances.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
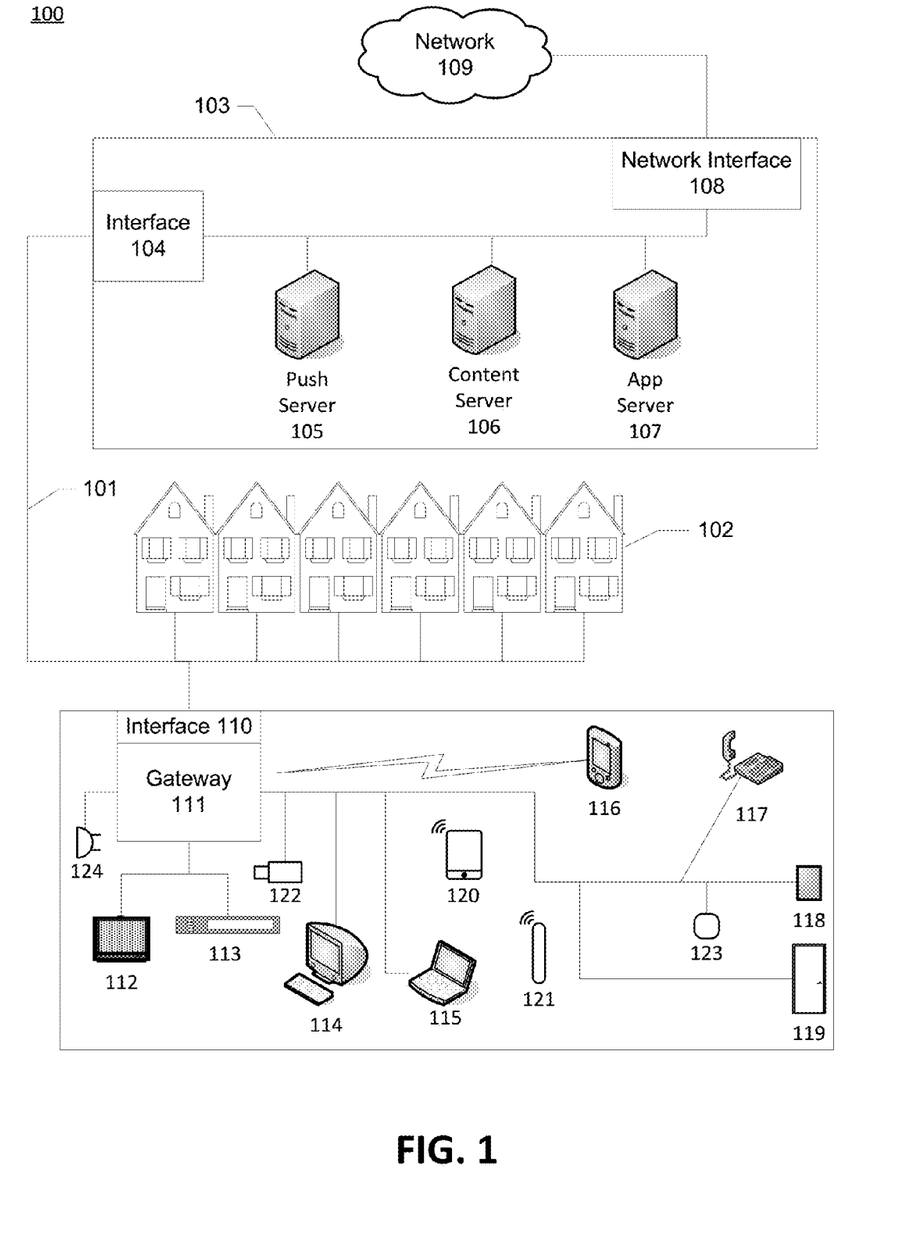
FIG. 1 illustrates an example information access and distribution network that may be used to implement one or more aspects as described herein.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 110 (such as a modem, or another receiver and/or controller device suitable for a particular network), which may include controllers and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, ZigBee interfaces and others.

Figure 2:
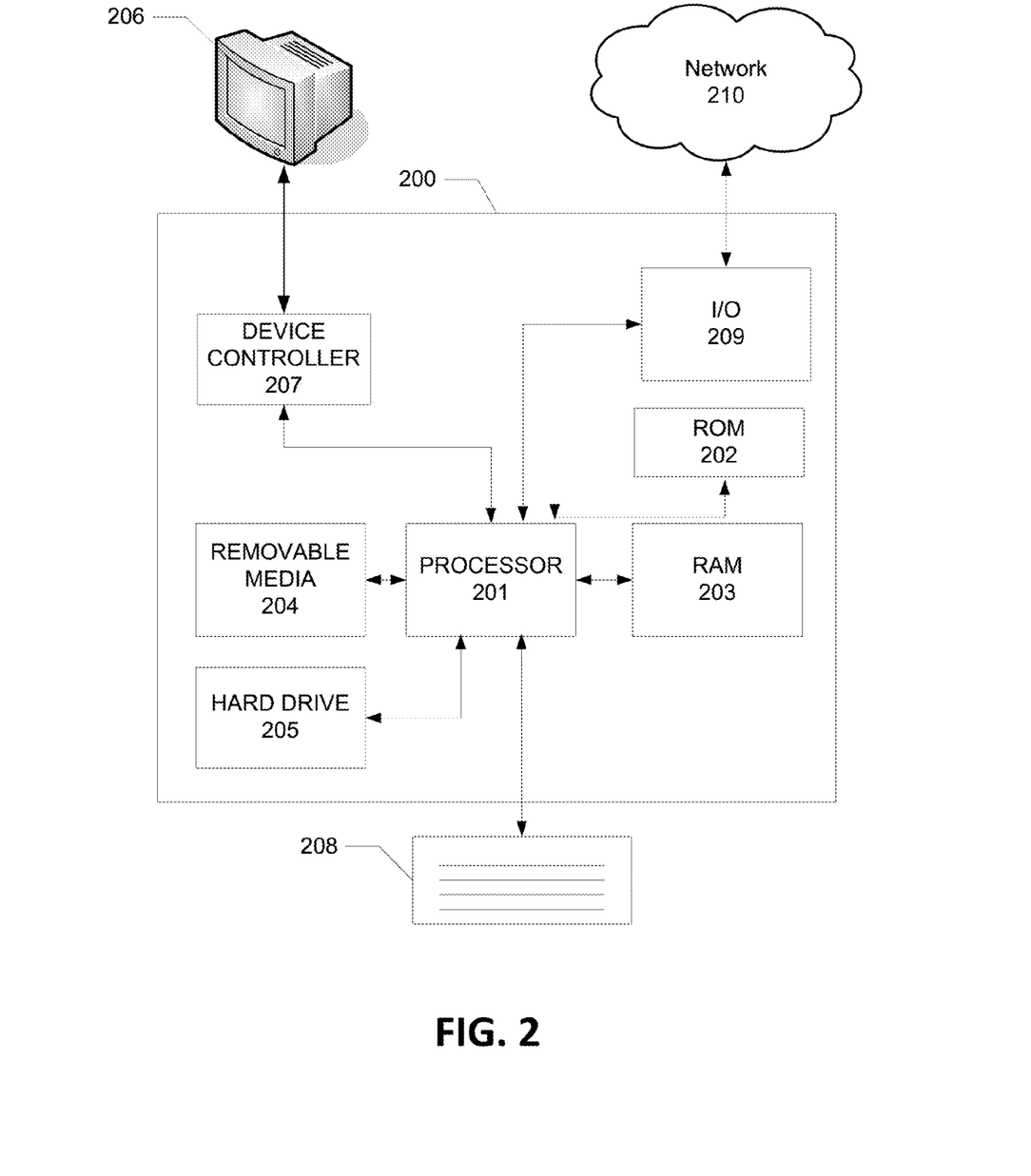
FIG. 2 illustrates an example computing device that may be used to implement one or more aspects as described herein.

FIG. 2 illustrates general hardware elements of an example computing device 200 that can be used to implement one or more aspects of the elements discussed herein and/or illustrated in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The interface between the computing device 200 and the user input devices 208 may be a wired interface, wireless interface, or a combination of the two, including IrDA interfaces, Bluetooth interfaces and ZigBee interfaces, for example. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is an exemplary hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
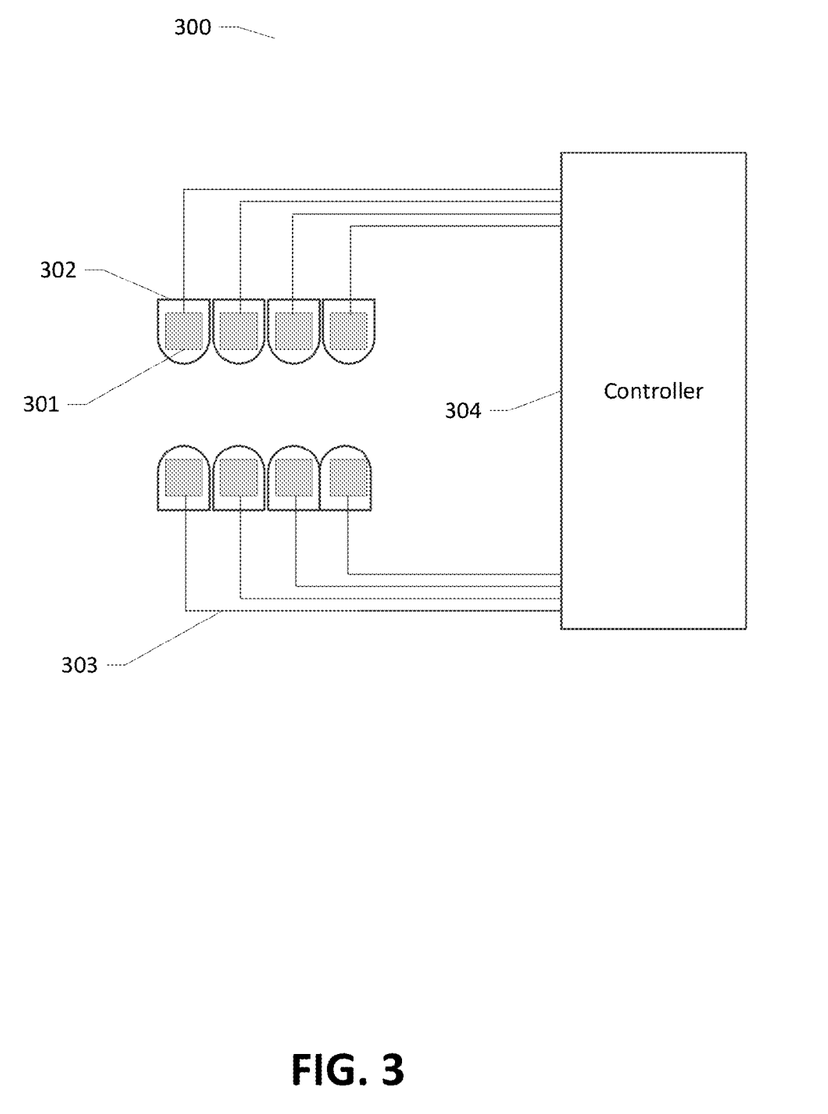
FIG. 3 illustrates an example apparatus in accordance with one or more aspects as described herein.

FIG. 3 illustrates an example intraoral input apparatus 300 in accordance with one or more aspects as described herein. The apparatus 300 may contain one or more sensors 301 attached to a user's tooth 302. The sensor 301 may be attached using an adhesive, such as a dental adhesive, for example. In some embodiments, multiple sensors 301 may be attached to an individual tooth 302. In the example illustration, one sensor is attached to each tooth. In some example embodiments, the sensor 301 may be a capacitive sensor. In other embodiments, the sensor may be a pressure sensor. It can be appreciated that other types of sensors may be used; pressure or capacitive sensors are simply used herein for example. In an example embodiment, there may be multiple different types of sensors attached to a user's teeth. Some users may find that an improved experience results from having two or more types of sensors. For example, it may be that some teeth are in positions that make them harder to press. In such examples, it may be preferable to affix a capacitive sensor to those teeth. Continuing the exemplary embodiment, some teeth may be in positions that make them too easy to touch, so that they are inadvertently touched by a user, for example while performing other activities such as eating or talking. It may be preferable to affix a pressure sensor to those teeth.

The illustration in FIG. 3 is a simplified example where only a subset of a user's teeth is shown in order to provide better clarity of the apparatus. Sensors 301 may be attached to one or more of a user's teeth. In some embodiments, sensors 301 may be attached to a subset of the user's teeth, for example, sensors 301 may be attached to two or three teeth. In other embodiments, sensors may be attached to all of the user's teeth. In some embodiments, sensors may be attached to various surfaces of a tooth. It can be appreciated that when a larger number of sensors are used, there is enabled a larger set of functions, as will be described in more detail below. A controller 304 may be in electrical communication with each of the sensors 301. In various embodiments, controller 304 may be positioned inside or outside of a user's mouth. The electrical communication may be provided via conductive wires 303 connecting the sensor 301 to the controller 304, for example in embodiments where the controller is positioned inside a user's mouth. Alternatively, the electrical communication may be accomplished via wireless communication, using a wireless protocol such as ZigBee or Bluetooth, for example.

Referring again to FIG. 3, when a user touches a sensor, for example, with the user's tongue, a sensor signal is generated by the sensor. In the example of a pressure sensor, the sensor signal may have an amplitude that corresponds to the amount of pressure exerted by the tongue onto the sensor. An amplitude exceeding a certain threshold may be understood to be indicative of a user input. The threshold may be also adjusted. For example, the pressure threshold may be set to a higher value, in order to reduce inadvertent user input. In other examples, the pressure threshold may be set to a lower value, in order to make it easier for a user to provide input. In the example of a capacitive sensor, an indication of capacitance may be generated by the sensor. The controller 304 generates an action signal upon receiving a sensor signal indicative of sufficient pressure amplitude or capacitive indication, for example. In some cases, the controller 304 may transmit the action signal outside of the user's mouth using a wireless protocol such as Bluetooth or ZigBee, for example. In other embodiments, the controller 304 may transmit the action signal outside of the user's mouth via a wired connection.

In some embodiments, the action signal generated by the controller 304 may be a command, such as a command according to the ZigBee Remote Control standard. In such embodiments, the action signal may be interpreted as a command, for example, when received by a gateway 111. In other embodiments, the action signal generated by the controller 304 may be a command according to the ZigBee Input Device standard. In such embodiments, the action signal may be interpreted as a command, for example, when received by computer 200. In such embodiments, the intraoral input apparatus 300 may function as an input device 208.

In other embodiments, the action signal generated by the controller 304 may provide identifying information, such as the identity or the location of the sensor. In such embodiments, an external device, such as computer 200, may act as an intermediary by receiving the identifying information, determining the appropriate command and forwarding the command to the device under control, for example, gateway 111, television 112, set top box 113, or various appliances. Similarly, other devices, such as personal computers 114, laptop computers 115, wireless devices 116 (wireless laptops, tablets and netbooks, mobile phones, mobile televisions, personal digital assistants (PDA), etc.) and tablet computers 120 may act as the intermediary in these embodiments.

In still other embodiments, the identifying information provided by the controller 304 may be received by the device under control, for example, gateway 111, television 112 or set top box 113, and the device under control may determine the appropriate command.

Figure 4:
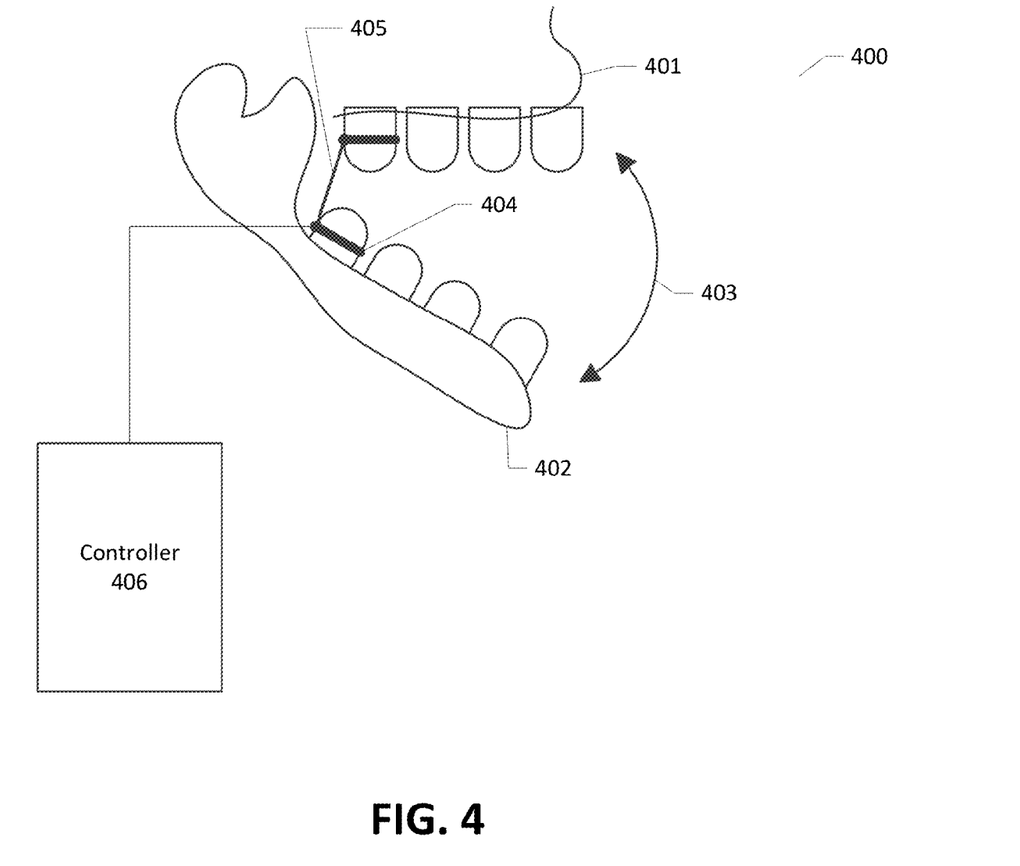
FIG. 4 illustrates an example apparatus in accordance with one or more aspects as described herein.

FIG. 4 depicts an example jaw position detector apparatus 400 in accordance with one or more disclosed features described herein. In some embodiments, the jaw position detector 400 may provide an indication of an angle 403 of the jaw opening, defined as the angle between an upper jaw 401 and a lower jaw 402. In some other embodiments, the jaw position detector 400 may provide a distance between an upper jaw 401 and a lower jaw 402. In some embodiments, the position detector may comprise an elastic band 405 attached between an upper tooth and a lower tooth. The elastic band 405 may stretch as the lower jaw 402 moves away from the upper jaw 401. The band 405, in the example given, is shown affixed to rear teeth through use of bands or braces 404 around the teeth, holding the band in place so that it does not slip off as the jaw is opened. The opening of the jaw increases the length of the elastic band, thereby stretching it. The act of stretching the band causes a force to be exerted at the connection points. In the example illustrated, the force may be measured by, for instance, a force sensor, tension sensor or a load cell attached to, or embedded in, band or brace 404. The controller 406, upon receiving a jaw position indication, may determine whether the jaw position indication is within a pre-determined range. In some embodiments, after determining that the jaw position indication is within a pre-determined range, the controller 406 may transmit an action signal outside of the user's mouth using a wireless protocol such as Bluetooth or ZigBee, for example. In some other embodiments, the controller 406 may transmit the action signal outside of the user's mouth via a wired connection. In some embodiments, the controller 406 may evaluate the jaw position indication before accepting or transmitting user inputs from the intraoral input apparatus 300.

While an elastic band 405 is depicted in FIG. 4, the band may be made from any suitable material, including a spring, for example. Alternatively, proximity detectors may be affixed to an upper and a lower surface, such as to a tooth on the upper jaw and a tooth on the lower jaw, and used to detect the separation of the surfaces, from which a distance or angle can be determined. For example, an angle may be calculated based on the location of the sensors or the angle may be found in a lookup table, based on the particular user and sensor installation. The jaw position detector 400 may be used to prevent false inputs by the tongue. For example, tongue inputs might be disabled when the jaw is not open to a particular angular range. In an example embodiment, inputs might be disabled when the jaw angle is not between 15 degrees and 30 degrees. In such embodiments, when a user wants to provide input via the intraoral input apparatus 300, the user may open their jaw, forming an angle within the particular angular range, thereby enabling input. At other times, when the user has not formed a jaw angle within the particular angular range, the inputs might be disabled, thereby preventing unintended user input. In still other embodiments, there may be multiple pre-determined jaw positional ranges and action signals may be transmitted, based in part on the jaw positional range. There are other uses for the jaw position detector; this is an example embodiment.

Figure 5:
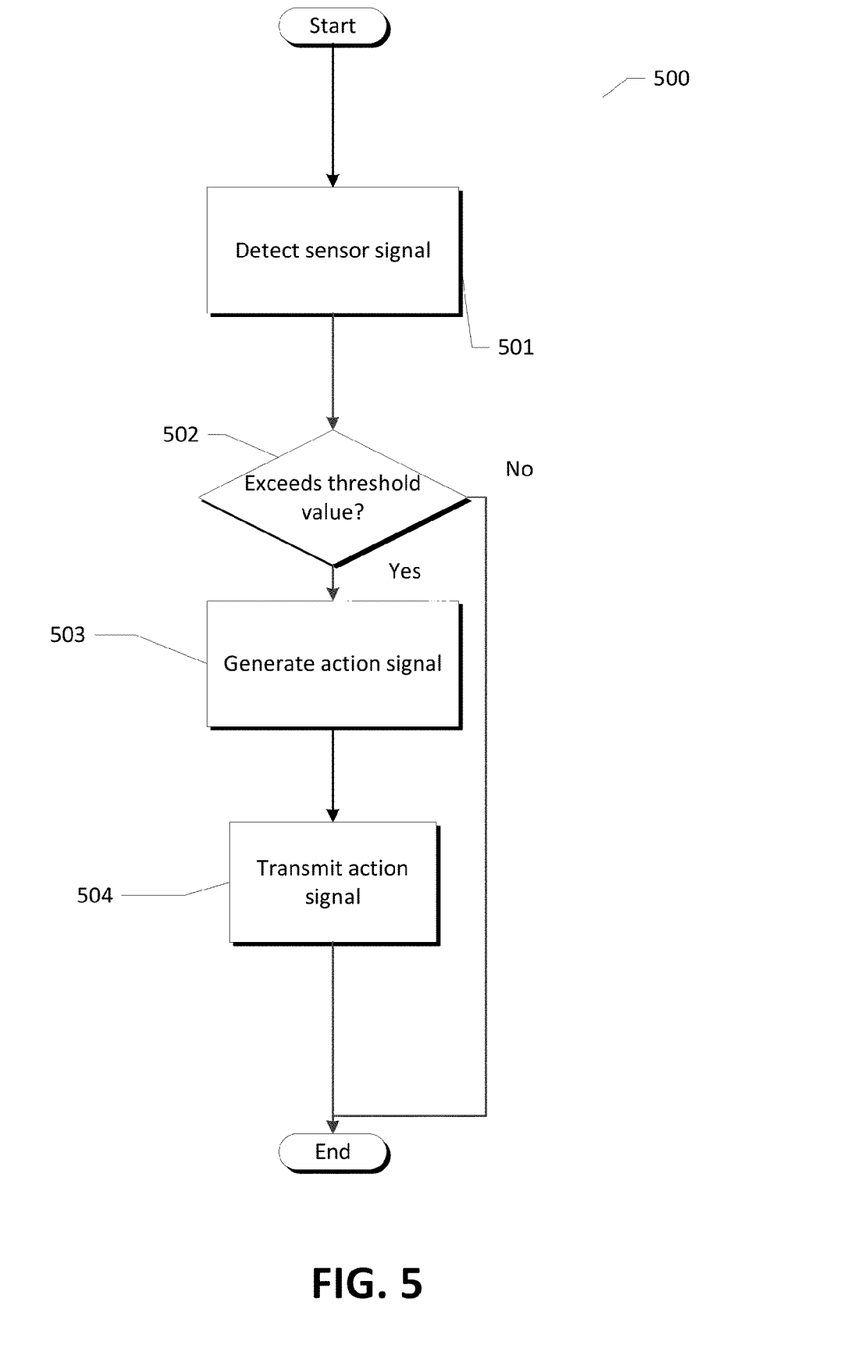
FIGS. 5-6 illustrate example flow charts for performing methods in accordance with one or more aspects as described herein.

FIG. 5 is an exemplary flow diagram illustrating an example process 500 in accordance with one or more disclosed features described herein. At step 501, a sensor signal is detected. A sensor signal may be generated when a sensor is activated, for example, from a tongue touch or press on a sensor, depending on the type of sensor used.

At step 502, it may be determined whether the detected sensor signal exceeds a threshold value. A threshold value may be checked to distinguish the sensor signal from noise. In examples where a pressure sensor is used, the amplitude of the sensor signal may be further checked in order to determine the magnitude of the pressure on the sensor. This may be useful, for example, in determining how hard the user has pressed on the sensor. In some embodiments, the magnitude of the force applied to the pressure sensor may be used to determine the action signal.

If it is determined that the detected sensor signal exceeds a threshold value, an action signal is generated at step 503.

Referring again to FIG. 5, in some embodiments, the step 502 may include an elapsed time consideration where a detection of a sensor signal for a pre-determined amount of time may be an indication that the user is holding the tongue against the sensor. This may be interpreted as a hold action, in contrast to a tap action, where a user may touch a sensor and quickly take the tongue away from the sensor. By distinguishing between tap and hold user actions, the method 500 may enable many more commands to be supported by the methods described herein. For example, a tap by the tongue on a sensor may result in an action signal related to a numeric character to be generated, while a hold on the same sensor may result in an action signal related to a function to be generated.

Figure 6:
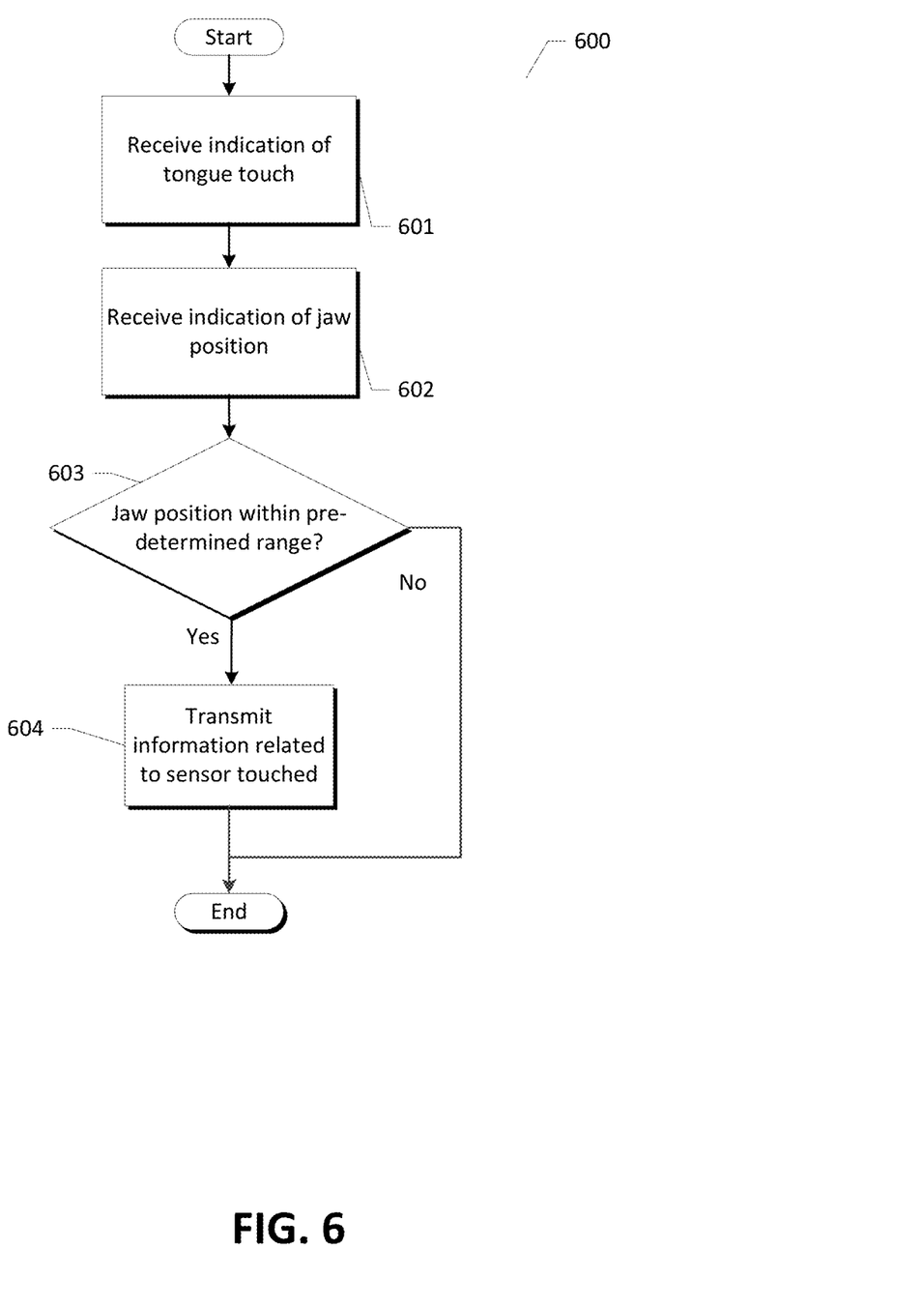

FIG. 6 is an exemplary flow diagram illustrating an example process 600 in accordance with one or more disclosed features described herein. At step 601 a touch is received by one of the sensors.

At step 602, an indication of the jaw position is received. As described above in relation to FIG. 4, the position of the jaw may be used to determine whether the user input should be accepted. In some embodiments, a user may control whether inputs are accepted by positioning the jaw to a particular angular range.

At step 603, it is determined whether the indication of the jaw position is within a pre-determined range.

If the result of the determination in step 603 is that the indication of the jaw position is within the predetermined range, the process may move to step 604 where information related to the sensor touched is transmitted. In some embodiments, the information may include the identification of the sensor and the amplitude of the signal. In other embodiments, the information may be a digital command string of data, for example conforming to the ZigBee RF4CE standard.

Figure 7:
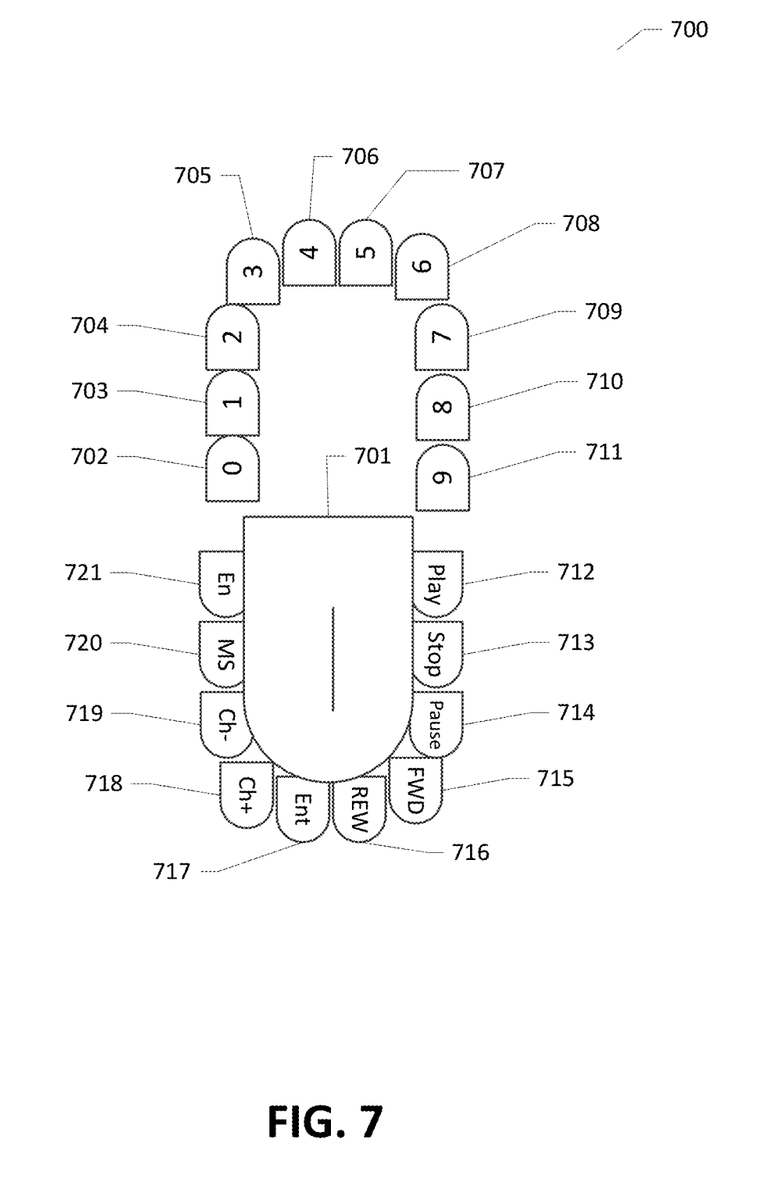
FIG. 7 illustrates an example character mapping in accordance with one or more aspects as described herein.

FIG. 7 is an exemplary depiction illustrating a mapping 700 of the sensors to character values. In the example in FIG. 7, it can be seen that character values are mapped to the sensors. The user may be able to select from the characters by touching or pressing on the sensor associated with the character mapping. In the example illustration, sensor positions correspond to teeth positions; the sensors themselves are not shown. For the sake of clarity, a subset of teeth is shown and a subset of characters will be illustrated. It should be understood that more sensors could be used, allowing more characters to be mapped. Note that a character, as used herein, may include commands.

Referring again to FIG. 7, a description will be set forth for an example embodiment depicting a mapping to control a gateway 111. A typical gateway 111 may be operated or controlled though use of an associated remote control device. The remote control device typically provides numerals for channel selection as well as media viewing controls, such as fast forward, reverse, stop, pause, etc. In an example remote control mapping embodiment, sensors identified by item numbers 702 through 711 may be assigned to the character values for the numerals 0 through 9 respectively. Item 701 represents the user's tongue, in the illustration. Item 712 may map to the character for "play", item 713 may map to "stop", item 714 may map to "pause", item 715 may map to "fast forward", item 716 may map to "rewind". Continuing the example, item 717 may map to "enter", item 718 may map to "channel up" and item 719 may map to "channel down". In some example embodiments, a user may configure or reassign the mapping of sensor to character or command.

Item 720 may correspond to a map switching command (MS) for switching the sensor mapping to a second mapping, as in some embodiments disclosed herein. A second mapping may be useful when a user wants to control a second device, for example. In some examples, a second mapping may be useful when there are not enough sensors to completely map all of the functions of a first device. For example, in the example discussed above, due to the limited number of sensors depicted in the illustration, several useful functions might not have been mapped. Through use of the map switching command 720 and a second mapping, additional functions can be performed by mapping those functions to the second mapping of the sensors. The map switching command 720 may function as a single entry shift where the next entry input by the user after the map switching command 720 would be from the second mapping. Alternatively, the map switching command 720 may change the mapping for all subsequent entries to the second mapping until the map switching command 720 is again selected, whereby the mapping would be shifted back to the first mapping. As an example of multiple mappings, one mapping may be for control of television 112 and a second mapping may be for control of set top box 113. It should be understood that many other types of electronic devices may be controlled with the appropriate mapping and that, in some embodiments, more than two mappings may be provided.

Referring again to FIG. 7, a description will be set forth for an example embodiment of mapping a user input to a gesture. There are many possible gestures that can be envisioned, for example, a gesture may be used to move a cursor on a display. Alternatively, a gesture may represent a particular input character or command. A gesture may be detected by the activation of adjacent sensors within a predefined period of time. As an example, should a user move their tongue across sensors 715 through 718, affixed to teeth in the lower jaw, for example, from left to right in a continuous manner in a short period of time (for example, one second), the corresponding detection of the sensor signals may represent a gesture. The gesture might be known to the user as a swipe left to right along the lower teeth. By doing so, the user has input a gesture. Continuing the example above in relation to the control of a television, the gesture may be used to raise the volume. Similarly, a swipe from right to left may be used to lower the volume, for example. It should be understood that with the methods provided herein, a large number of gestures may be realized. The example given above is simply for a particular embodiment. In the example given above, the sensors were adjacent, however, any sensors may be included in a gesture and they need not be adjacent in every embodiment.

Referring again to FIG. 7, item 721 depicts a sensor for enabling (En) or disabling user input in accordance with one or more disclosed features described herein. As a means to prevent accidental or unintended user input, methods are provided to allow a user to control when an input should be accepted by the intraoral input apparatus 300. In some embodiments, the intraoral input apparatus may be put into a mode where certain user inputs are disabled. This mode may be entered or exited via a touch or press on a selected sensor. For example, the sensor at item 721 may be the designated enable/disable mode switch sensor. Sensors other than 721 may be disabled until the user touches or presses on sensor 721, thereby enabling the monitoring of the other sensors. When the user has finished providing inputs, the user may again touch or press on sensor 721 to exit the mode and return the apparatus to a mode where certain inputs are disabled.

While an example remote control mapping embodiment has been described above, those skilled in the art will recognize that the apparatus and methods as described herein may be used for controlling various other devices or appliances. For example, in some embodiments a thermostat, such as a home heating and cooling system thermostat, may be operated by use of the apparatus. A thermostat typically includes various controls, such as temperature up, temperature down, fan speed settings such as high, medium and low, heat/cool settings, on/off settings, etc. In an example thermostat control mapping embodiment, various sensors, such as those identified by item numbers 702 through 711, may map to the various thermostat controls as described above. For example, sensor 705 may map to "temperature up" while sensor 708 may map to "temperature down".

In some embodiments, the apparatus and methods as described herein may be used for controlling switches for room lighting. For example, sensor 702 may map to "lights on" while sensor 711 may map to "lights off". In various embodiments, the apparatus and methods as described herein may provide for control other devices, appliances or systems, including alarm systems, washers, dryers, home entertainment systems, coffee makers, refrigerators, microwave ovens, toasters, communications systems and others.

Figure 8:
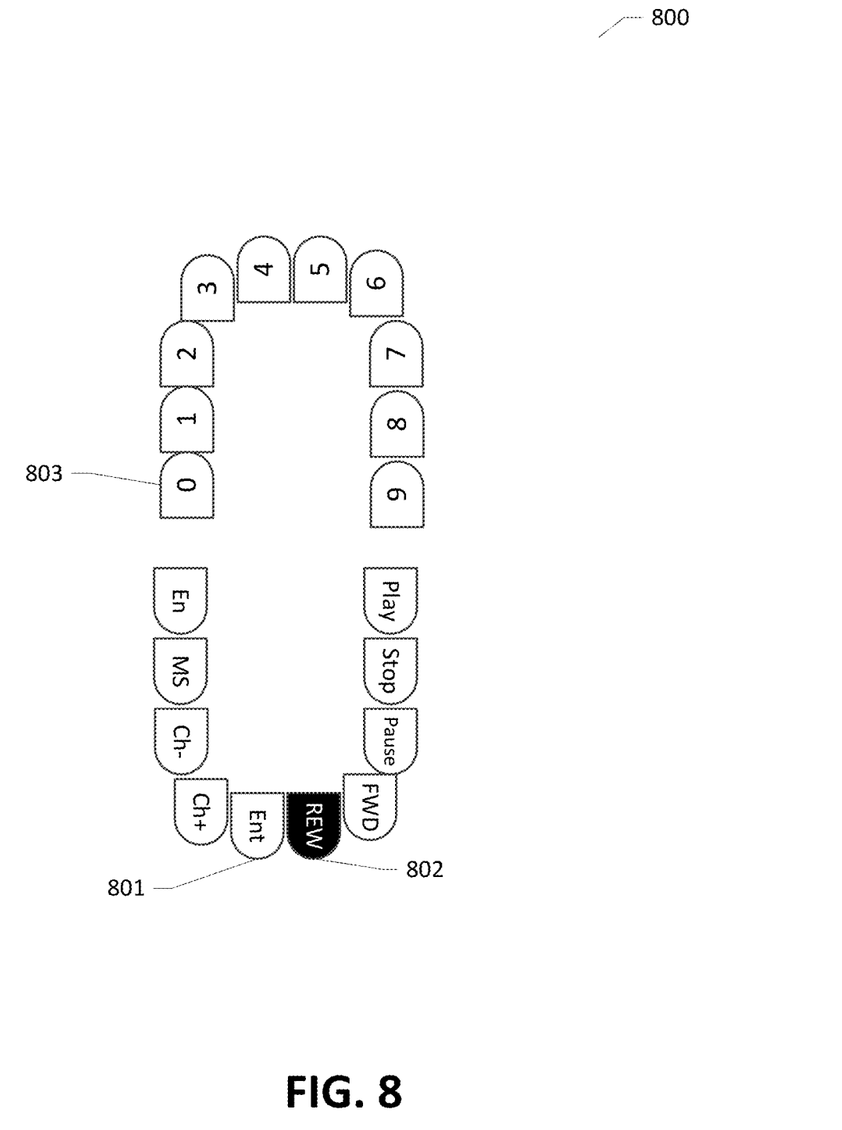
FIG. 8 illustrates an example display of a positional representation in accordance with one or more aspects as described herein.

FIG. 8 is an exemplary depiction illustrating a display of a positional representation 800 of the sensors with an enhanced representation of a sensor associated with a detected sensor signal. In the example in FIG. 8, item 801 represents a sensor on a tooth on the lower jaw and item 803 represents a sensor on a tooth on the upper jaw. Items 801 and 803 represent sensors that are not currently generating a sensor signal. Item 802 (REW) represents a sensor on the lower jaw that is being touched or pressed by the user and is generating a sensor signal. If the user were to move their tongue to another sensor, the display would be updated to show the newly touched sensor with an enhanced representation, such as a visually enhanced representation. The user of the intraoral input apparatus 300 may refer to this positional representation 800 on a display for feedback as to their tongue position. In an exemplary embodiment, the display may be presented on television 112, or other display means, in order to show to the user their current tongue position. Among the many different possibilities contemplated, the display may present additional information, such as the currently assigned mapping of sensors to characters or commands, or information about a device being controlled, for example. The methods used in the example to enhance or distinguish sensor 802 from the other sensors merely serve as one example. The depiction of sensor 802 may alternatively be enhanced in numerous other ways, including coloring, outlining, changing size or shape, attaching pointers or bubbles, etc. In some embodiments, the positional representation 800 may be used in other ways, including for training of the user in use of the intraoral input apparatus 300.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. An apparatus comprising:
    a plurality of sensors each configured to be affixed to a respective one of a plurality of teeth and configured to generate a respective sensor signal upon activation; and
    a controller in communication with the plurality of sensors, the controller configured to:
        cause presentation of a positional representation of the plurality of sensors, the positional representation comprising a mapping of respective commands to the plurality of sensors;
        receive a first sensor signal from a first one of the plurality of sensors;
        compare the first sensor signal with a sensor signal threshold value;
        generate an action signal when the first sensor signal exceeds the sensor signal threshold value; and update the positional representation of the plurality of sensors based on the action signal.

2. The apparatus of claim 1, wherein at least one of the plurality of sensors comprises a pressure sensor.

3. The apparatus of claim 1, wherein at least one of the plurality of sensors comprises a capacitive sensor.

4. The apparatus of claim 1, further comprising:
a jaw position detector, in communication with the controller, configured to detect a jaw position, the jaw position comprising a distance between an upper jaw and a lower jaw, the controller configured to generate the action signal when the first sensor signal exceeds the sensor signal threshold value and the distance exceeds a threshold.

5. The apparatus of claim 4, wherein the jaw position detector comprises an elastic band disposed between the upper jaw and the lower jaw.

6. A method comprising:
receiving, by a computing device, a first action signal corresponding to a first sensor, the first sensor configured to be affixed to a tooth;
causing presentation, on a display, of a positional representation indicating activation of the first sensor;
determining a device command corresponding to the first action signal; and
performing an action based on the device command.

7. The method of claim 6, wherein the computing device comprises a gateway and wherein the device command comprises a channel change command, a play command, a pause command, a stop command, or a volume control command.

8. The method of claim 6, wherein the performing of the action comprises transmitting the device command to a second computing device.

9. The method of claim 8, wherein the second computing device comprises a thermostat and wherein the device command comprises a temperature change command.

10. The method of claim 6, further comprising:
receiving a second action signal, the second action signal corresponding to a second sensor signal generated by a second sensor;
determining an elapsed time between the receiving of the first action signal and the receiving of the second action signal; and
determining a gesture based on the first action signal and the second action signal when the elapsed time is less than a predetermined value.

11. The method of claim 10, wherein the gesture comprises a swipe left or swipe right.

12. The method of claim 6, wherein the device command corresponds to a mapping change command the mapping change command to Change a first mapping associating the first sensor with a first value to a second associating the first sensor with a second value, the method further comprising:
receiving a second action signal, the second action signal corresponding to second sensor; and
determining a first device command or a second device command corresponding to the second action signal, based on the mapping change command.

13. The method of claim 6, further comprising:
determining a jaw position corresponding to a distance between an upper jaw and a lower jaw, wherein the performing of the action is in response to determining that the distance exceeds a threshold.

14. The method of claim 6, wherein the device command is a first device command, further comprising:
receiving a second action signal, the second action signal corresponding to a second sensor; and
determining a second device command corresponding to the second action signal.

15. A method comprising:
generating, for display, a first positional representation of a plurality of sensors, wherein each of the plurality of sensors is a sensor configured to be affixed to a respective tooth and generate a respective action signal upon activation;
receiving a first action signal, wherein the first action signal comprises information corresponding to a first sensor of the plurality of sensors; and
generating, for display, a second positional representation of the plurality of sensors indicating activation of the first sensor.

16. The method of claim 15, wherein the first positional representation or the second positional representation provides information corresponding to at least one sensor of the plurality of sensors.

17. The method of claim 16, wherein the information includes a first device command associated with the at least one sensor.

18. The method of claim 16, further comprising:
assigning a device command to the at least one sensor of the plurality of sensors.

19. The method of claim 17, further comprising:
receiving a second action signal, wherein the second action signal corresponds to a mode change command; and
generating, for display, a third positional representation of the plurality of sensors associating a second device command with the at least one sensor.

20. The method of claim 17, wherein the first device command comprises a channel change command, a play command, a pause command, a stop command, or a volume control command.

* * * * *

UNITED STATES PATENT AND TRADEMARK OFFICE
CERTIFICATE OF CORRECTION

| | | |
|---|---|---|
| PATENT NO. | : 9,626,860 B2 | Page 1 of 1 |
| APPLICATION NO. | : 14/699761 | |
| DATED | : April 18, 2017 | |
| INVENTOR(S) | : Martushev et al. | |

It is certified that error appears in the above-identified patent and that said Letters Patent is hereby corrected as shown below:

In the Specification

Column 3, Line 51:
Delete "102a" and insert --102--

In the Claims

Column 11, Claim 12, Line 51:
Delete "command" and insert --command,--

Column 11, Claim 12, Line 52:
Delete "Change" and insert --change--

Column 12, Claim 12, Line 1:
After "second", insert --mapping--

Column 12, Claim 12, Line 4:
After "to", insert --a--

Signed and Sealed this
Sixth Day of February, 2018

Joseph Matal
*Performing the Functions and Duties of the
Under Secretary of Commerce for Intellectual Property and
Director of the United States Patent and Trademark Office*